(12) United States Patent
Murphy et al.

(10) Patent No.: US 10,133,438 B2
(45) Date of Patent: Nov. 20, 2018

(54) USER INTERFACE FOR AUGMENTED REALITY

(75) Inventors: David Joseph Murphy, Helsinki (FI); Markus Tapio Kahari, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 240 days.

(21) Appl. No.: 13/119,609

(22) PCT Filed: Dec. 24, 2008

(86) PCT No.: PCT/IB2008/003629
§ 371 (c)(1),
(2), (4) Date: Mar. 17, 2011

(87) PCT Pub. No.: WO2010/032079
PCT Pub. Date: Mar. 25, 2010

(65) Prior Publication Data
US 2011/0173576 A1    Jul. 14, 2011

Related U.S. Application Data

(60) Provisional application No. 61/097,804, filed on Sep. 17, 2008.

(51) Int. Cl.
*G06F 3/048* (2013.01)
*G06F 3/0481* (2013.01)
*G06F 3/01* (2006.01)
(52) U.S. Cl.
CPC ............ *G06F 3/0481* (2013.01); *G06F 3/017* (2013.01)
(58) Field of Classification Search
CPC ........ G01C 21/36; G06F 3/0481; G06F 3/017

USPC ................................. 715/863, 705, 708, 855
See application file for complete search history.

(56) References Cited

U.S. PATENT DOCUMENTS

| | | | |
|---|---|---|---|
| 6,798,429 B2* | 9/2004 | Bradski .................... | 345/156 |
| 8,031,170 B2* | 10/2011 | Brown et al. ............ | 345/156 |
| 2004/0070611 A1 | 4/2004 | Tanaka et al. | |
| 2005/0206654 A1 | 9/2005 | Vaha-Sipila | |
| 2005/0256675 A1 | 11/2005 | Kurata | |
| 2006/0015247 A1 | 1/2006 | Speer | |
| 2007/0002452 A1 | 1/2007 | Munro | |
| 2007/0164988 A1 | 7/2007 | Ryu et al. | |
| 2007/0244634 A1 | 10/2007 | Koch et al. | |
| 2008/0059888 A1* | 3/2008 | Dunko ...................... | 715/744 |
| 2008/0195315 A1 | 8/2008 | Hu et al. | |

(Continued)

FOREIGN PATENT DOCUMENTS

EP    1752737 A2    2/2007

OTHER PUBLICATIONS

International Search Report and Written Opinion of the International Searching Authority from corresponding Patent Cooperation Treaty Application PCT/IB2008/003629, dated Aug. 5, 2010, pp. 1-10.

(Continued)

*Primary Examiner* — Andrey Belousov
(74) *Attorney, Agent, or Firm* — Alston & Bird LLP

(57) ABSTRACT

The disclosed embodiments are directed to a method, an apparatus, and a user interface. The disclosed embodiments include acquiring an image, identifying one or more objects of interest in the image, and providing an indication that additional information is available for the one or more of the objects of interest without obscuring the one or more objects of interest.

19 Claims, 10 Drawing Sheets

(56) References Cited

U.S. PATENT DOCUMENTS

2009/0125234 A1* 5/2009 Geelen et al. ............... 701/209
2013/0179076 A1* 7/2013 Kobuya ............... G01C 21/36
                                                                                    701/533

OTHER PUBLICATIONS

Tenmoku et al., "A Wearable Augmented Reality System Using Positioning Infrastructures and a Pedometer", Wearable Computers, 2003, Proceedings Seventh IEEE International Symposium on Oct. 21-23, 2003, Piscataway, NJ, USA, pp. 110-117.
Office Action for European Application No. 08 875 791.9 dated Apr. 15, 2016.
Decision to Grant European Patent for Application No. 08875791.9 dated Mar. 2, 2017, 1 page.

* cited by examiner

USER INTERFACE FOR AUGMENTED REALITY

CROSS REFERENCE TO RELATED APPLICATIONS

This application is a National Stage Entry of International Application No. PCT/IB2008/003629, filed Dec. 24, 2008, which claims the benefit of U.S. Provisional Application No. 61/097,804, filed Sep. 17, 2008, each of which are incorporated herein in their entirety.

BACKGROUND

1. Field

The disclosed embodiments generally relate to user interfaces and, more particularly, to an augmented reality user interface.

2. Brief Description of Related Developments

Augmented reality systems generally present a real-world view and additional data in a combined display. Augmented reality systems may enhance real-world images with computer-generated elements that may identify or provide additional information about items in the images. As an example, an augmented reality system may display an image of a building with superimposed text identifying the address and the names of businesses within the building.

Advances in computer vision, more powerful and smaller computers, and advances in position and orientation sensors are making portable, hand held augmented reality devices increasingly feasible. Portable devices are already capable of determining position and orientation to within a few meters and degrees. However, portable devices tend to have relatively small displays. Traditional overlays may partially or totally obscure the objects in view and may also obscure other parts of the surrounding area. When there are many objects in an area, the additional information may produce a large amount of visual clutter. In addition, a crowded view may make it difficult to match the additional information with what the user actually sees. FIGS. 1A and 1B show earlier display examples that rely on overlaying text on or near the objects for which additional information is available. Non-portable devices may also exhibit similar problems related to obscuring objects in view, visual clutter, and difficulties matching additional information with real world objects.

It would be advantageous to provide a scheme for presenting additional information on an augmented reality display that avoids the limitations of previous implementations.

SUMMARY

The following summary is intended to exemplary only and non-limiting.

The disclosed embodiments are directed to a method including acquiring an image, identifying one or more objects of interest in the image, and providing an indication that additional information is available for the one or more of the objects of interest without obscuring the one or more objects of interest.

The disclosed embodiments are also directed to an apparatus including an image capture device configured for acquiring an image, location circuitry configured for identifying one or more objects of interest in the image, and a display configured for providing an indication that additional information is available for the one or more of the objects of interest without obscuring the one or more objects of interest.

The disclosed embodiments are further directed to a user interface having an image capture device configured for acquiring an image, and a display configured for displaying one or more objects of interest identified in the image, and for providing an indication that additional information is available for the identified objects of interest in the image without obscuring the identified objects of interest.

BRIEF DESCRIPTION OF THE DRAWINGS

The foregoing aspects and other features of the embodiments are explained in the following description, taken in connection with the accompanying drawings, wherein.

DETAILED DESCRIPTION OF THE EMBODIMENT(S)

Figure 1A:
FIGS. 1A and 1B show earlier augmented reality display examples.
Figure 1B:
Figure 2:
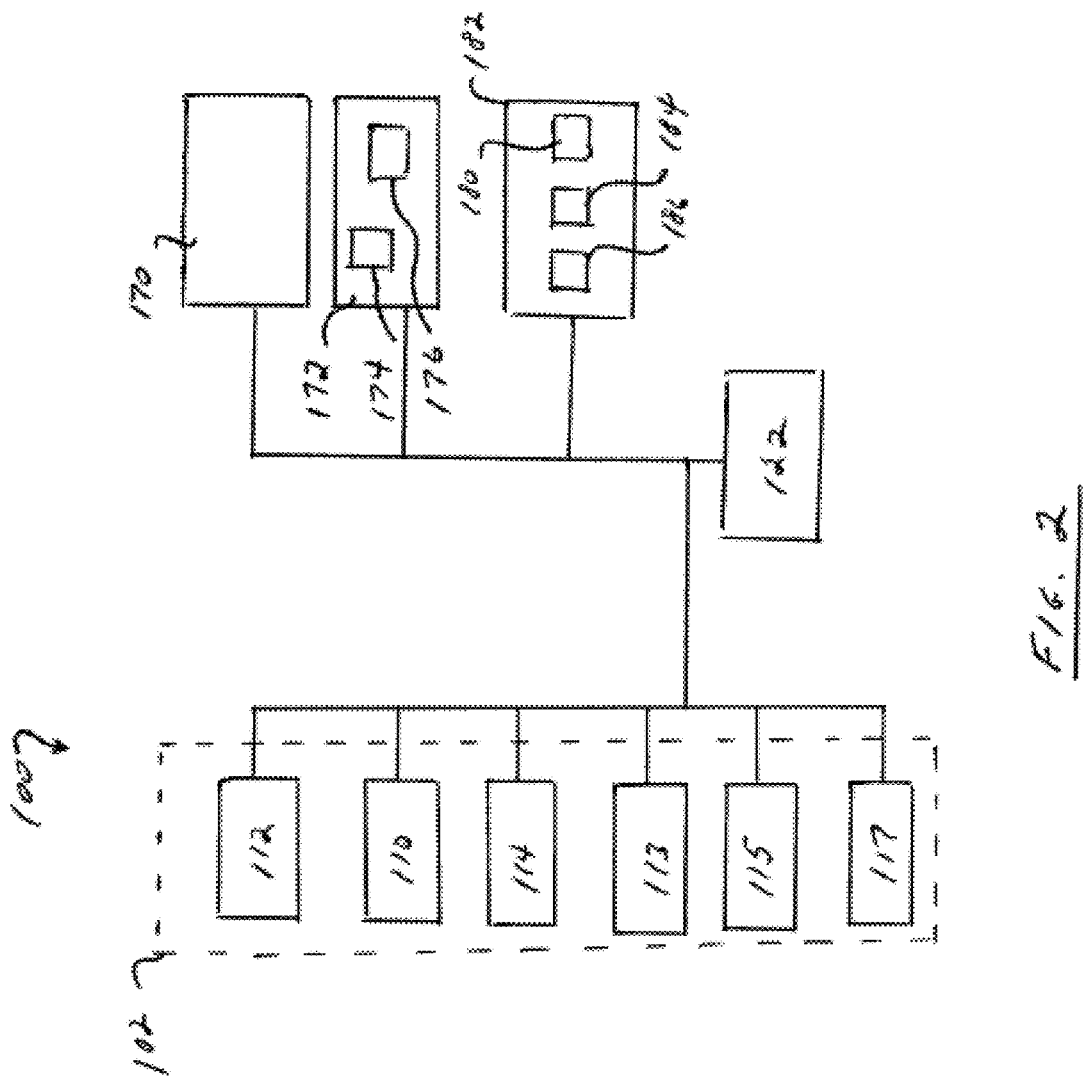
FIG. 2 shows an exemplary device 100 for practicing the disclosed embodiments.

FIG. 2 illustrates one embodiment of an exemplary device 100 in which aspects of the disclosed embodiments may be applied. Although aspects of the disclosed embodiments will be described with reference to the embodiments shown in the drawings and described below, it should be understood that these aspects could be embodied in many alternate forms and in any possible combination of elements. In addition, any suitable size, shape or type of elements or materials could be used.

The disclosed embodiments may generally incorporate a portion of an augmented reality display that provides an indication of additional information for real world objects and also avoids obscuring the real world objects. The disclosed embodiments also include an ability to highlight a real world object and provide the additional information on the display again while avoiding obscuring the highlighted real world object. The disclosed embodiments further include an ability to select display modes for acquiring and providing the additional information by changing the orientation of the augmented reality display device, or by gesturing.

FIG. 2 shows an exemplary augmented reality display device 100 for practicing the disclosed embodiments. Device 100 may be a portable device, for example, a mobile terminal, or may be a fixed device, for example, an outdoor telescope at a tourist attraction. Device 100 may be any suitable device, provided it is capable of supplying an augmented reality display. Device 100 may include a user interface 102, a processor 122 and a storage device 182. Device 100 may also include a communications function 170, and a location function 172.

The user interface 102 of the disclosed embodiments may include input and output devices for interaction with one or more users, and with the environment of the augmented reality display device. User interface 102 may include both touch and non-touch devices. Touch devices may include a touch screen or proximity screen device 112 which may be responsive to user input and may also include a display. In alternate embodiments, the aspects of the user interface 102 disclosed herein may be embodied on any suitable device that will display information and allow the selection and activation of applications, system content, and the functions of the embodiments described herein. The terms "select" and "touch" are generally described with respect to a touch screen-display. However, in alternate embodiments, the terms are also intended to encompass required user action with respect to other input devices. For example, with respect to the touch/proximity screen device 112, it may not be necessary for a user to make direct contact with the touch/proximity screen device 112 in order to select an object, other information, or to initiate an application.

Thus, the above noted terms are intended to encompass that a user only needs to be within the proximity of touch/proximity screen device 112 to carry out the desired function. For example, the term "touch" in the context of the touch/proximity screen device 112, does not necessarily require direct contact, but may include near or close contact that activates the touch/proximity screen device 112. Similarly, the scope of the intended devices is not limited to single touch or contact devices. Multi-touch devices, where contact by one or more fingers or other pointing devices can navigate on and about the screen are also intended to be encompassed by the disclosed embodiments.

Non-touch devices 117 are also intended to be encompassed by the disclosed embodiments. Non-touch devices may include, but are not limited to, brain computer interfaces (BCI) and devices without touch or proximity screens. In one embodiment, with non-touch devices such as BCI a user may use thoughts to control the devices described herein (i.e. through neuro-physiological signals detected from the brain or from other suitable nervous tissue).

The user interface 102 may also include keys 110, for example, hard keys, soft keys, a keyboard, etc. for receiving user input, and a microphone 113 for receiving voice commands.

The user interface 102 may also include an image capture device 115, for example, a camera, for implementing the embodiments described herein.

The user interface 102 may also include one or more displays 114 which, as mentioned above, may be part of touch/proximity screen 112, or may be separate devices. The one or more displays generally provide information to a user including menus for selecting functions of the augmented reality display device 100.

Still referring to FIG. 2, the processor 122 operates to control the functions of the augmented reality display device 100. The processor may receive inputs, for example, signals, transmissions, instructions or commands related to the functions of the device 100 from user interface 102, storage device 182, and communications function 170. The processor 122 interprets the inputs and controls the functions of the augmented reality display device 100 accordingly.

Storage device 182 generally includes instructions or commands for the processor 122 related to the functions of the device 100. Storage device 182 includes computer readable media encoded with computer executable components, software, programs, instructions, commands, etc. for implementing the embodiments disclosed herein. Storage device 182 may utilize optical, magnetic, chemical, electrical, or any other suitable properties for receiving, storing, or delivering instructions and commands. Storage device 182 may include magnetic media, such as a diskette, disk, memory stick or computer hard drive, which is readable and executable by a computer. In other embodiments, storage device 182 may include optical disks, read-only-memory ("ROM") floppy disks and semiconductor materials and chips. Storage device 182 may generally utilize any suitable technology for implementing the embodiments disclosed herein.

Storage device 182 may also include applications 180 and application settings 184 for other functions, for example, data acquisition (e.g. image, video and sound), data processing (spread sheets, word processor, contact lists, currency converters, etc.), multimedia players (e.g. video and music players), various web services, and any other suitable applications. Storage device 182 may also include one or more databases 186 that include maps of any geographic location as well as information related to objects that may be present in the vicinity of the augmented reality display device 100.

Communications function 170 may include circuitry and programs for providing any suitable communications tasks for implementing the disclosed embodiments. Communications function may include facilities for any type of satellite, mobile, wireless, wide area network, local area network, or public switched telephone network communications, or any other suitable communication facilities.

Location function 172 may generally include circuitry and programs for determining the location, orientation, and forces being applied to the augmented reality display device 100, and for determining the location of and identifying objects captured by the image capture device 115. For example, location function 172 may include a global positioning system processor 174, a compass, one or more accelerometers, and any other suitable sensors referred to collectively as sensors 176. As a further example, augmented reality display device 100 may use the global positioning system processor 174 to determine its own location. In some embodiments, location function 172 may include circuitry and programs for determining the location and orientation of the augmented reality display device 100 using computer or machine vision. For example, the location function may communicate with the image capture device and may perform among other things, image acquisition, detection, segmentation, feature extraction, etc. alone or in combination with the other functions, circuitry and programs of the augmented reality display device 100 to determine the location and the orientation of the device 100.

Figure 3A:
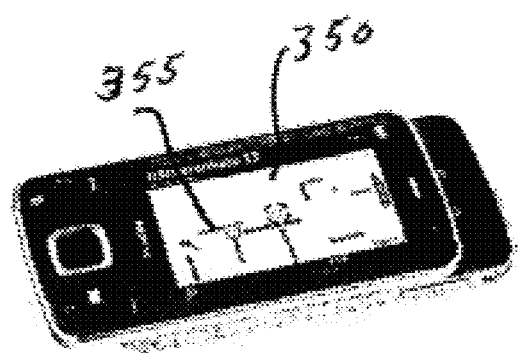
FIGS. 3A-3C show examples of different orientations for the augmented reality display device 100.
Figure 3B:
Figure 3C:
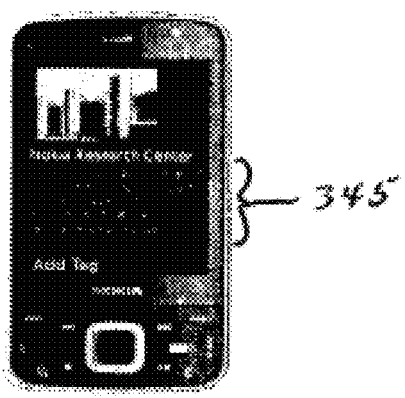

FIGS. 3A-3C show examples of different orientations for the augmented reality display device 100. By utilizing the sensors, and optionally applications 180 and application settings 184, the augmented reality display device 100 may determine its own orientation, for example, horizontal, as shown in FIG. 3A, vertical landscape, as shown in FIG. 3B, or vertical portrait, as shown in FIG. 3C. Other orientations of the augmented reality display device 100 may also be determined. Moving the augmented reality display device 100 from one orientation to another, from one position to another, or from one position returning to the same position, may be referred to as a gesture, or gesturing.

The augmented reality display device 100 may also use the one or more of the sensors, and optionally the applications 180 and application settings 184 to determine the locations of objects in its vicinity. The augmented reality display device 100 may also determine the locations of objects in its vicinity by processing images captured by the image capture device 115. In some embodiments, the augmented reality display device 100 may utilize computer or machine vision as described above to determine the location of objects in its vicinity. The augmented reality display device 100 may also utilize computer or machine vision to identify the objects. In some embodiments the augmented reality display device 100 may use the location of the object to identify the object.

The disclosed embodiments may be utilized as described in the following examples.

In some embodiments, discovery of objects may be aided by using a map view provided by the augmented reality display device 100. FIG. 3A shows an example of such a view 350. The map view 350 may be invoked in various ways, for example, from a menu selection on the user interface, by changing the orientation of the augmented reality display device 100 to a horizontal position as shown in FIG. 3A, or by any other suitable method. Upon invoking the map view 350, a map 355 of an area may be displayed. Maps may be retrieved from the one or more databases 186 (FIG. 2), from a remote device or service using communications function 170, or any combination of the two. Objects of interest may be highlighted on the map. The map view may be used to guide a user, that is, aid a user in finding objects of interest.

The user may use the image capture device 115 to view objects. In some embodiments this may be accomplished by manipulating the augmented reality display device 100 to a vertical landscape orientation (FIG. 3B). Upon sensing the orientation, the augmented reality display device 100 may provide a heads up view as observed by the image capture device 115.

Figure 3D:
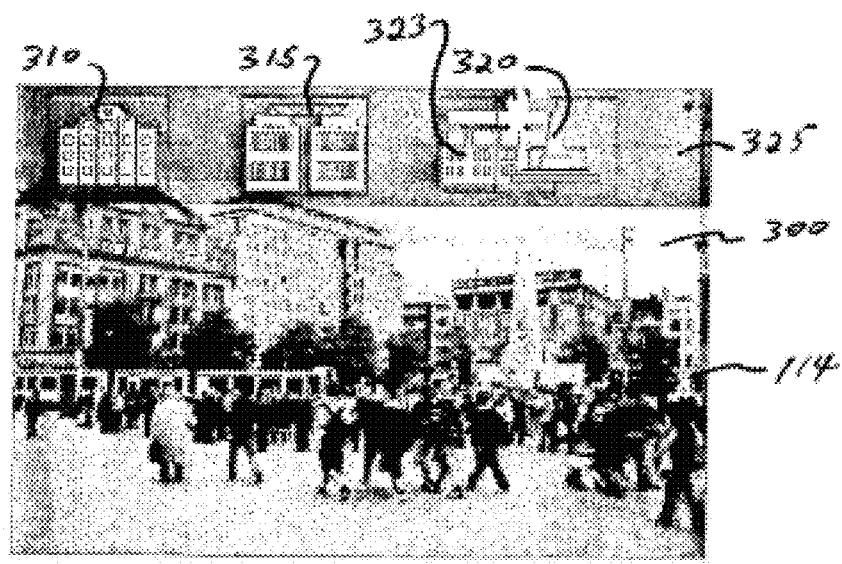
FIGS. 3D and 3E show examples of heads up views used in implementing the disclosed embodiments.

FIG. 3D shows an example of such a heads up view 300 that may be provided by display 114. Objects in the view may then be identified using the location function 172. An indication that additional information is available for one or more of the objects may then be provided. For example, objects in the view 300 for which additional information is available may be indicated by icons 310, 315, 320, 323 portrayed in a portion 325 of the display. The icons 310, 315, 320, 323 may be diagrammatic, schematic, pictorial, or any other type of representation of objects in the view 300. The portion 325 of the display may reside along the top as shown, or may reside along one of the sides or the bottom of the display. The portion 325 of the display may also reside in any suitable location of the display that avoids obscuring the objects in the view. In some embodiments, the icons 310, 315, 320, 323 may resemble or otherwise represent objects in the view and may be tethered, or otherwise located on the display to correspond to the real world positions of the objects. In other embodiments, the icons 310, 315, 320, 323 may extend over a wider field than the view 300 but may be positioned in the same order as the real world positions so that a correspondence may be made between an icon and the object it represents. In some embodiments, the icons 310, 315, 320, 323 may be sized or placed in the view to indicate the distance from the corresponding object to the augmented reality display device 100. In at least one embodiment, the icons 310, 315, 320, 323 may overlap or be interleaved, for example when objects in the view are close to each other or overlap. See for example, icons 320 and 323.

Figure 3E:
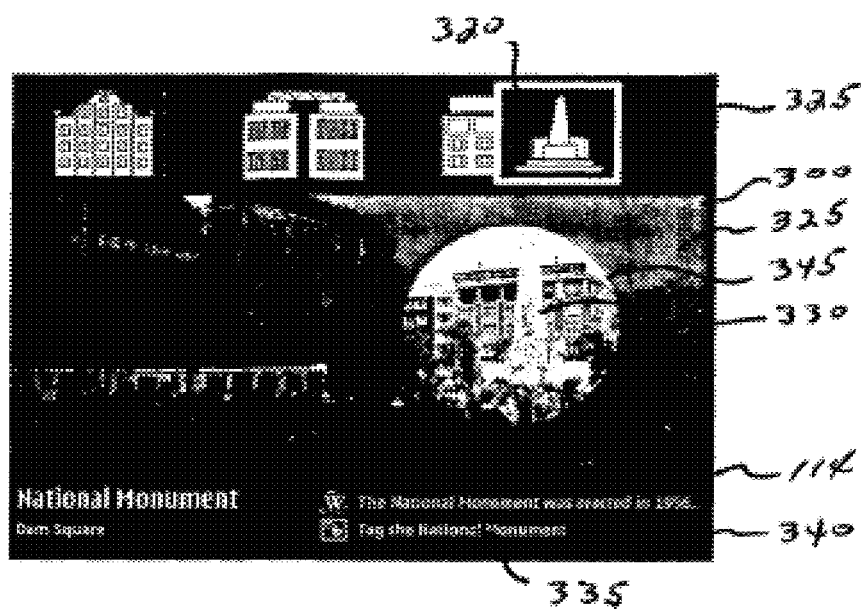

Turning to FIG. 3E, one or more of the icons 310, 315, 320, 323 may be selected, for example, icon 320. In other embodiments, the object corresponding to the icon may alternately be selected. Upon selection of exemplary icon 320 or corresponding object 330, object 330 may be highlighted in a non-obscuring manner. For example, a dark transparent layer may be rendered over the view 300 except in an area 345 surrounding the object 330. The area 345 may be sized according to the size of the object 330 in the view 300 and may also be sized to compensate for any uncertainty in determining the position of object 330. In some embodiments, the selected icon might be enlarged or replicated elsewhere on the display 114, for example, to allow a user to more easily recognize the corresponding object, or for example, to compensate for inaccuracies in the location of the icon or object.

As a result of the selection, additional information 335 related to the object may be shown in another portion 340 of the display 114. Thus, the objects in the view 300 are not obscured by the additional information. The additional information 335 may include identification information, links to other information related to the object 330, actions that may be performed related to the display and the object 330, or any other suitable information, actions, links, etc. Upon selection of a link to other information, the other information may be displayed.

In some embodiments, the additional information 335 may be obtained from the one or more databases 186 (FIG. 2). In some embodiments, the augmented reality display device 100 may obtain at least a part of the additional information 335 from a remote device or service using communications function 170. Similarly, one or more of the links in the additional information may link to a remote device or service by utilizing communications function 170.

In some embodiments, once the additional information 335 is displayed, even further information 345 (FIG. 3C) may be displayed upon demand. The further information may include at least a portion of the additional information 335, further details related to the object 330, further links to other information, further actions that may be performed related to the display and the object 330, or any other suitable information, actions, links, etc. The further information may be displayed for example, by manipulating one or more of keys 110, touch screen or proximity screen device 112, non-touch devices 117, or any other suitable component of user interface 102. In some embodiments, the further information may be displayed for example, by changing the orientation of the augmented reality display device 100, for example, to a vertical-portrait orientation as shown in FIG. 3C, or by a gesture as described above.

Figure 4:
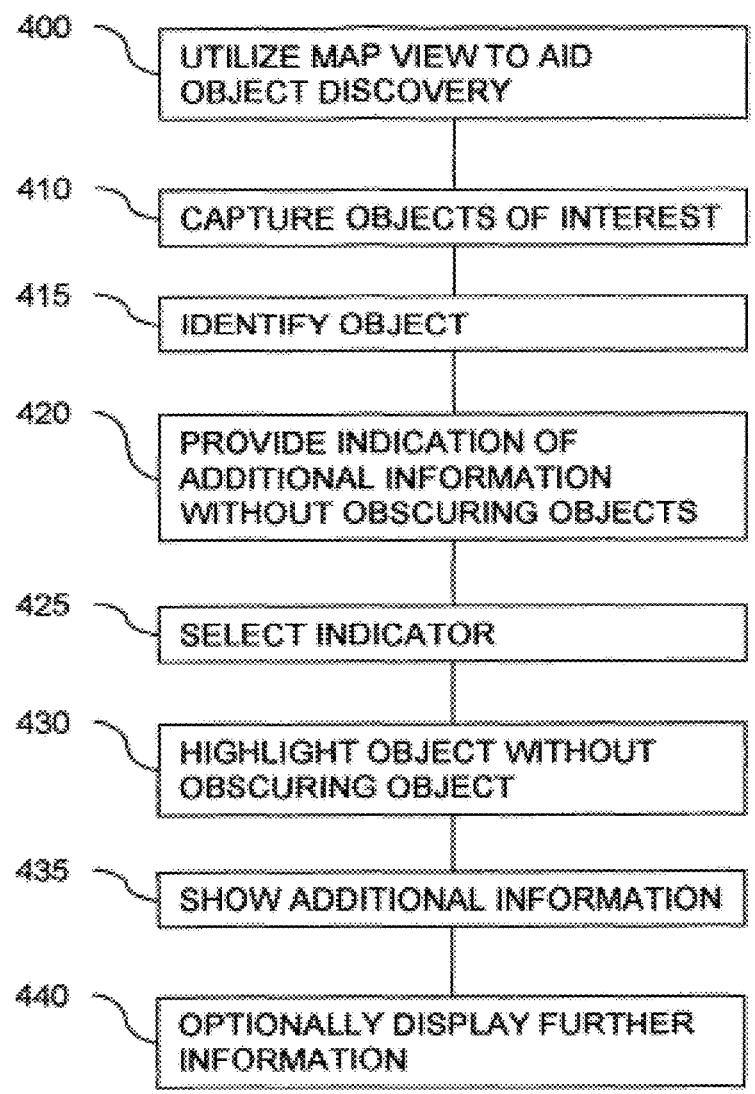
FIG. 4 illustrates a flow diagram of a process in accordance with the disclosed embodiments.

FIG. 4 illustrates a flow diagram of a process in accordance with the disclosed embodiments. In block 400 a map view may be optionally used to aid in object discovery. In block 410 one or more objects of interest may be captured using the image capture device 115. In block 415 one or more of the objects may be identified and in block 420 an indication may be provided signifying that additional information for one or more of the objects is available. The indication may be provided without obscuring the objects. In block 425, one of the indicators may be selected, and in block 430 the corresponding object is highlighted without obscuring the highlighted object. In block 435 additional information related to the object may be shown, again without obscuring the selected object. Thus, the objects of interest are not obscured when displaying additional information. As mentioned above, the additional information may include identification information, links to other information related to the object 330, actions that may be performed related to the display and the object 330, or any other suitable information, actions, links, etc. As shown in block 440, optionally, even further information may displayed related to the corresponding object.

As a result of the exemplary embodiments, objects may be annotated without being obscured, user interaction is streamlined, and the highlighting may be sized to correspond with the size of an object and may also be sized to compensate for any uncertainty in an object's position.

Figure 5A:
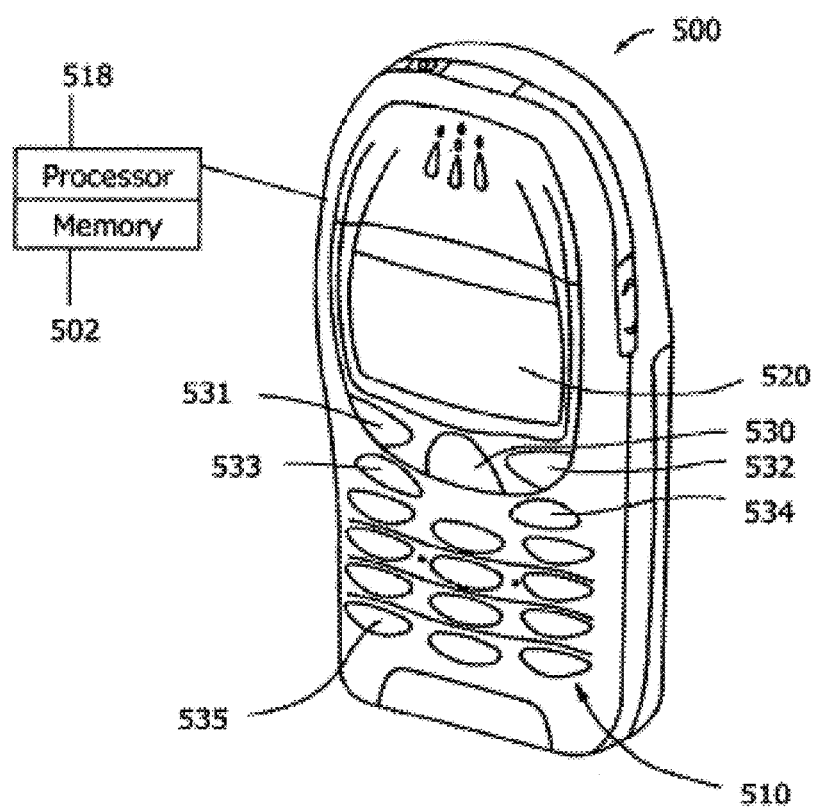
FIGS. 5A and 5B are illustrations of examples of devices that may be used to practice aspects of the disclosed embodiments.
Figure 5B:
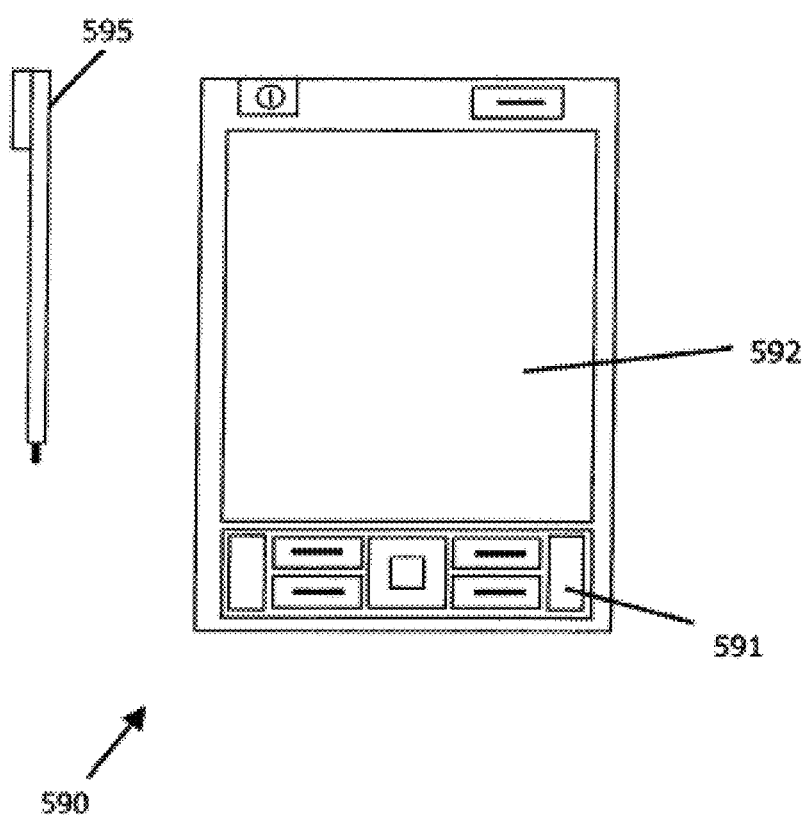

Examples of devices on which aspects of the disclosed embodiments can be practiced are illustrated with respect to FIGS. 5A and 5B. A terminal or mobile communications device 500 may incorporate all the functions of an augmented reality display device as described above. The terminal or mobile communications device 500 have a keypad 510 and a display 520. The keypad 510 may include any suitable user input devices such as, for example, a multi-function/scroll key 530, soft keys 531, 532, a call key 533, an end call key 534 and alphanumeric keys 535. The display 520 may be any suitable display, such as for example, a touch screen display or graphical user interface. The display may be integral to the device 500 or the display may be a peripheral display connected to the device 500. A pointing device, such as for example, a stylus, pen or simply the user's finger may be used with the display 520. In alternate embodiments any suitable pointing device may be used. In other alternate embodiments, the display may be for example a flat display that is typically made of an liquid crystal display (LCD) with optional back lighting, such as a thin film transistor (TFT) matrix capable of displaying color images. In still other alternate embodiments, the display may be any suitable conventional display.

The device 500 may also include other suitable features such as, for example, a camera, loud speaker, connectivity port or tactile feedback features. The mobile communications device may have a processor 518 connected to the display for processing user inputs, displaying information on the display 520, and for controlling the terminal or mobile communications device 500 according to the augmented reality display embodiments described herein. A memory 502 may be connected to the processor 518 for storing any suitable information and/or applications associated with the mobile communications device 500 such as phone book entries, calendar entries, instructions or commands related to the functions of displaying augmented reality disclosed herein, etc. Memory 502 may include computer readable media encoded with computer executable components software, programs, instructions, commands, etc. for implementing the embodiments disclosed herein.

Figure 6:
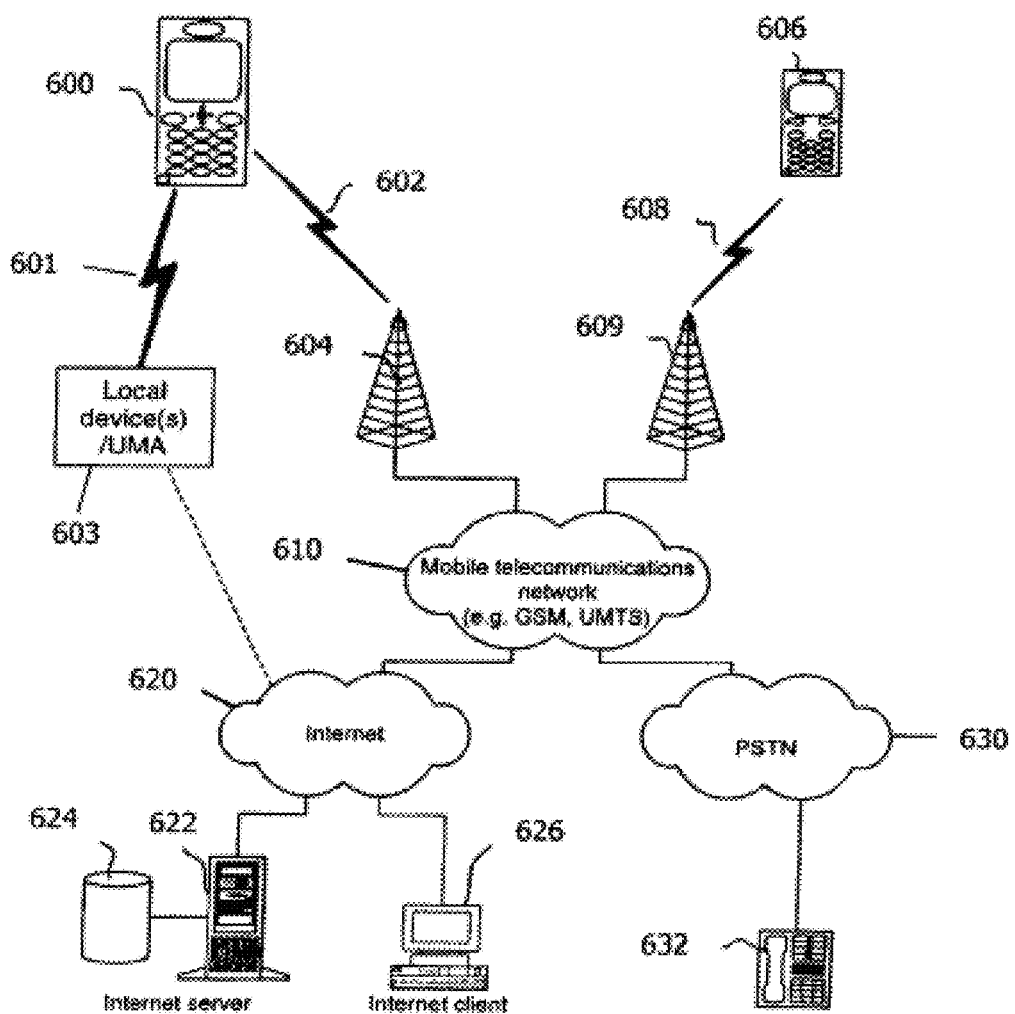
FIG. 6 illustrates a block diagram of an exemplary system incorporating features that may be used to practice the disclosed embodiments.

In the embodiment where the device 500 comprises a mobile communications device, the device can be adapted for communication in a telecommunication system, such as that shown in FIG. 6. In such a system, various telecommunications services such as cellular voice calls, worldwide web/wireless application protocol (www/wap) browsing, cellular video calls, data calls, facsimile transmissions, data transmissions, music transmissions, still image transmission, video transmissions, electronic message transmissions and electronic commerce may be performed between a mobile terminal 600 and other devices, such as another mobile terminal 606, a line telephone 632, a personal computer 626 and/or an internet server 622.

The mobile terminal 600 generally includes all the features of terminal or mobile communications device 500 and augmented reality display device 100. It is to be noted that for different embodiments of the mobile terminal 600 and in different situations, some of the telecommunications services indicated above may or may not be available. The aspects of the disclosed embodiments are not limited to any particular set of services in this respect.

The mobile terminals 600, 606 may be connected to a mobile telecommunications network 610 through radio frequency (RF) links 602, 608 via base stations 604, 609. The mobile telecommunications network 610 may be in compliance with any commercially available mobile telecommunications standard such as for example global system for mobile communications (GSM), universal mobile telecommunication system (UMTS), digital advanced mobile phone service (D-AMPS), code division multiple access 2000 (CDMA2000), wideband code division multiple access (WCDMA), wireless local area network (WLAN), freedom of mobile multimedia access (FOMA) and time division-synchronous code division multiple access (TD-SCDMA).

The mobile telecommunications network 610 may be operatively connected to a wide area network 620, which may be the Internet or a part thereof. An Internet server 622 has data storage 624 and is connected to the wide area network 620, as is an Internet client computer 626. In some embodiments, data storage 624 may include at least a portion of maps 355 (FIG. 3A), additional information 335 (FIG. 3E), and further information 345 (FIG. 3C). One or more of the links in the additional information 335 may link to data or invoke one or more programs stored in data storage 624. The server 622 may host a worldwide web/wireless application protocol server capable of serving worldwide web/wireless application protocol content to the mobile terminal 600.

A public switched telephone network (PSTN) 630 may be connected to the mobile telecommunications network 610 in a familiar manner. Various telephone terminals, including the stationary telephone 632, may be connected to the public switched telephone network 630.

The mobile terminal 600 is also capable of communicating locally via a local link 601 to one or more local devices 603. The local link 601 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The above examples are not intended to be limiting, and any suitable type of link may be utilized. The local devices 603 may be antennas and supporting equipment forming a wireless local area network implementing Worldwide Interoperability for Microwave Access (WiMAX, IEEE 802.16), WiFi (IEEE 802.11x) or other communication protocols. The wireless local area network may be connected to the Internet. The mobile terminal 600 may thus have multi-radio capability for connecting wirelessly using mobile communications network 610, wireless local area network or both. Communication with the mobile telecommunications network 610 may also be implemented using WiFi, Worldwide Interoperability for Microwave Access, or any other suitable protocols, and such communication may utilize unlicensed portions of the radio spectrum (e.g. unlicensed mobile access (UMA)). In one embodiment, the processor 122 of FIG. 2 can include a communications module that is configured to interact with the system described with respect to FIG. 6.

Although the above embodiments are described as being implemented on and with a mobile communication device, it will be understood that the disclosed embodiments can be practiced on any suitable device incorporating a display, processor, memory and supporting software or hardware. In one embodiment, the augmented reality display device 100 of FIG. 2 may be implemented in, for example, a personal digital assistant (PDA) style device 590 illustrated in FIG. 5B. The personal digital assistant 590 may have a keypad 591, a touch screen display 592 and a pointing device 595 for use on the touch screen display 592. In still other alternate embodiments, the device may be a personal computer, a tablet computer, touch pad device, Internet tablet, a laptop or desktop computer, a mobile terminal, a cellular/ mobile phone, a multimedia device, a personal communicator, or any other suitable device capable of containing, for example, a display 114 shown in FIG. 2, and supported electronics such as the processor 122 and memory 182.

Figure 7:
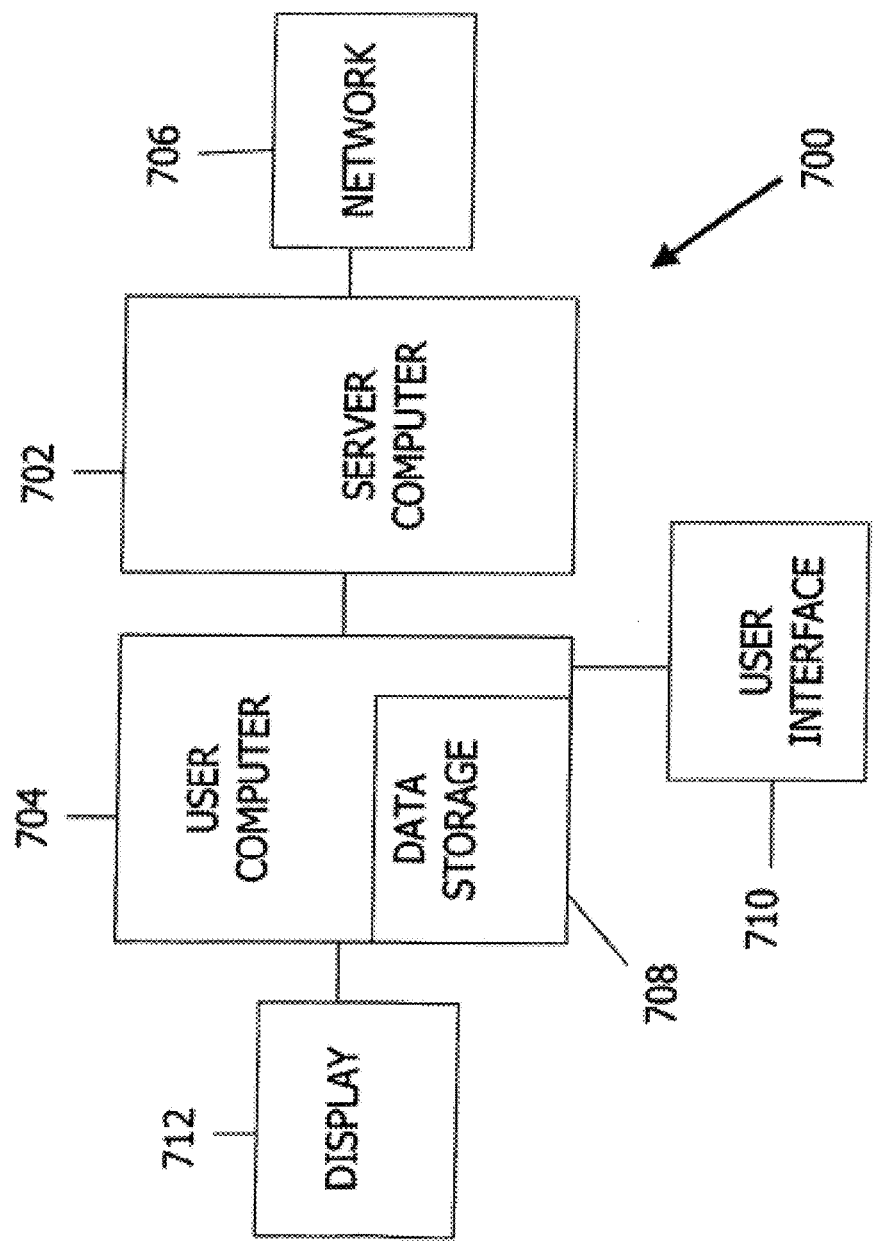
FIG. 7 shows a block diagram illustrating the general architecture of an exemplary system in which the exemplary devices of FIGS. 5A and 5B may be used.

The disclosed embodiments may also include software and computer programs incorporating the process steps and instructions described above that are executed in different computers. FIG. 7 is a block diagram of one embodiment of a typical apparatus 700 incorporating features that may be used to practice aspects of the disclosed embodiments. The apparatus 700 can include a computer readable media with computer executable components or program code embodied therein for implementing the disclosed embodiments. As shown, a computer system 702 may be linked to another computer system 704, such that the computers 702 and 704 are capable of sending information to each other and receiving information from each other. Computer 704 generally includes all the features of augmented reality display device 100.

In one embodiment, computer system 702 could include a server computer adapted to communicate with a network 706. Computer systems 702 and 704 can be linked together in any conventional manner including, for example, a modem, wireless, hard wire connection, or fiber optic link. Generally, information can be made available to both computer systems 702 and 704 using a communication protocol typically sent over a communication channel or through a dial-up connection on an integrated services digital network (ISDN) line. Computers 702 and 704 are generally adapted to utilize program storage devices with computer readable media embodying computer executable components, for example, machine-readable program source code, which is adapted to cause the computers 702 and 704 to implement the embodiments disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 702 and 704 may also include a microprocessor for executing stored programs. Computer 704 may include a data storage device 708 on its program storage device for the storage of information and data. The computer program or software implementing the disclosed embodiments may be stored in one or more computers 702 and 704 on an otherwise conventional program storage device. In one embodiment, computers 702 and 704 may include a user interface 710, and a display interface 712 from which aspects of the disclosed embodiments may be accessed. The user interface 710 and the display interface 712 may be adapted to allow the input of queries and commands to the system, as well as present the results of the commands and queries.

The exemplary embodiments described herein are provided as non-limiting examples of providing an augmented reality display with one or more indications that additional information for objects in view is available. The indications are provided in a manner that avoids obscuring the objects. The embodiments also provide an ability to highlight an object and provide the additional information, also in a manner that avoids obscuring the highlighted object. The embodiments further provide for selecting display modes for acquiring and providing the additional information by changing the orientation of the augmented reality display device, or gesturing. Thus, objects may be annotated and highlighted without being obscured image clutter is avoided It is noted that the embodiments described herein may be used individually or in any combination thereof. It should be understood that the foregoing description is only illustrative of the embodiments. Various alternatives and modifications may be devised by those skilled in the art without departing from the embodiments. Accordingly, the present embodiments are intended to embrace all such alternatives, modifications and variances that fall within the scope of the disclosure.

What is claimed is:

1. A method comprising:
providing for presentation, by a display, of a first view in response to detecting a first orientation of an apparatus, wherein the first view comprises a map view;
causing a gesture to be detected, wherein the gesture is provided by changing an orientation of the apparatus to a second orientation;
providing for presentation, by the display, of a second view in response to detecting the gesture, wherein the second view comprises an augmented reality view;
causing an image to be acquired using an image capture device in response to detecting the gesture;
identifying two or more objects of interest in the image;
providing for display in a portion of the display of two or more icons for indicating that additional information is available for two or more of the objects of interest, wherein the two or more icons provided for display each comprise icon representations of their respective objects of interest and are presented in an order corresponding to real world positions of their respective objects of interest, wherein the portion of the display having the two or more icons resides in a location that avoids obscuring the augmented reality view;
receiving a selection of one of the icons representing an object of interest for which additional information is available; and
providing for display of the additional information in the augmented reality view without obscuring the object of interest represented by the selected icon.

2. The method of claim 1, further comprising providing for identification of the one or more objects of interest in the map view.

3. The method of claim 1, further comprising causing further information about the selected icon representing the object of interest to be displayed in response to a detected second gesture, wherein the second gesture is provided by changing an orientation of the apparatus to a third orientation.

4. A computer program product comprising computer readable code stored on a computer readable medium, the computer readable code configured to execute the method according to claim 1.

5. An apparatus comprising at least one processor and at least one memory including computer program code, the at least one memory and the computer program code configured to, with the at least one processor, cause the apparatus to:
provide for presentation, by a display, of a first view in response to detecting a first orientation of an apparatus, wherein the first view comprises a map view;
receive an indication of a gesture, wherein the gesture is provided by changing the orientation of the apparatus to a second orientation;
provide for presentation, by the display, of a second view in response to detecting the gesture, wherein the second view comprises an augmented reality view;
cause an image to be acquired in response to sensing the gesture;
identify two or more objects of interest in the image;
provide for display in a portion of the display of two or more icons for indicating that additional information is available for two or more of the objects of interest, wherein the two or more icons provided for display each comprise icon representations of their respective objects of interest and are presented in an order corresponding to real world positions of their respective objects of interest, wherein the portion of the display having the two or more icons resides in a location that avoids obscuring the augmented reality view;
receive selection of one of the icons representing an object of interest for which additional information is available, and
provide for display of the additional information in the augmented reality view without obscuring the object of interest represented by the selected icon.

6. The apparatus of claim 5, wherein the apparatus is further caused to identify the one or more objects of interest in the map view.

7. The apparatus of claim 5, wherein the apparatus is further caused to provide for display of further information for the selected object of interest upon sensing a second gesture, wherein the second gesture is provided by changing an orientation of the apparatus to a third orientation.

8. A user interface comprising:
a display;
a sensor configured to detect a first orientation of an apparatus, wherein the display is configured for presenting a first view in response to the sensor detecting the first orientation of the apparatus, wherein the first view comprises a map view;
wherein the display is configured for presenting a second view in response to the sensor detecting a gesture, wherein the gesture is provided by changing the orientation of an apparatus to a second orientation, wherein the second view comprises an augmented reality view; and
an image capture device configured for acquiring an image in response to the sensor detecting the gesture;
wherein a portion of the display is configured for displaying two or more objects of interest identified in the image and providing for display of two or more icons for indicating that additional information is available for two or more of the objects of interest, wherein the two or more icons provided for display each comprise icon representations of their respective objects of interest and are presented in an order corresponding to real world positions of their respective objects of interest, wherein the portion of the display having the two or more icons resides in a location that avoids obscuring the augmented reality view, and
wherein the display is further configured for displaying additional information within another portion of the second view about an object of interest associated with a selected icon representing the object of interest without obscuring the selected identified object.

9. The user interface of claim 8, wherein the display is further configured for displaying the identified objects of interest in the map view.

10. The user interface of claim 8, wherein the display is further configured to cause further information for the selected object of interest to be displayed upon demand.

11. A computer program product comprising at least one non-transitory computer-readable storage medium having computer-executable program code instructions stored therein, the computer-executable program code instructions comprising:
program code instructions to provide for presentation, by a display, of a first view in response to detecting a first orientation of an apparatus, wherein the first view comprises a map view;
program code instructions to receive an indication of a gesture, wherein the gesture is provided by changing an orientation of the apparatus to a second orientation;
program code instructions to provide for presentation, by the display, of a second view in response to detecting the gesture, wherein the second view comprises an augmented reality view;
program code instructions to cause an image to be acquired in response to detecting the gesture;
program code instructions to identify two or more objects of interest in the image;
program code instructions to provide for display in a portion of the display of two or more icons for indicating that additional information is available for two or more of the objects of interest, wherein the two or more icons provided for display each comprise icon representations of their respective objects of interest and are presented in an order corresponding to real world positions of their respective objects of interest, wherein the portion of the display having the two or more icons resides in a location that avoids obscuring the augmented reality view;
program code instructions to receive selection of one of the icons representing an object of interest for which additional information is available, and
program code instructions to display the additional information in another portion of the augmented reality view without obscuring the object of interest represented by the selected icon.

12. The computer program product of claim 11, further comprising program code instructions to display one or more icons to indicate that additional information is available for the one or more of the objects of interest.

13. The computer program product of claim 11, further comprising program code instructions to identify the one or more objects of interest in the map view.

14. The computer program product of claim 12, further comprising program code instructions to provide for display of further information for the selected object of interest upon sensing a second gesture, wherein the second gesture is provided by changing an orientation of the apparatus to a third orientation.

15. The method of claim 1, wherein the two or more icons provided for display are each provided in a size representative of a distance from the apparatus, and a position representative of a position relative to the apparatus.

16. The method of claim 1, further comprising:
receiving a selection of an icon representing a first object of interest in the image; and
highlighting the first object of interest in the image in response to receiving the selection of the icon representing the first object of interest.

17. The method of claim 1, wherein the two or more icons comprise pictorial representations of their respective objects of interest.

18. The method of claim 1, further comprising providing for display of the selected one of the icons in an enlarged view without obscuring the object of interest represented by the selected icon in the augmented reality view.

19. A method comprising:
providing for presentation, by a display, of a first view in response to detecting a first orientation of an apparatus, wherein the first view comprises a map view;
causing a gesture to be detected, wherein the gesture is provided by changing an orientation of the apparatus to a second orientation;
providing for presentation, by the display, of a second view in response to detecting the gesture, wherein the second view comprises an augmented reality view;
causing an image to be acquired using an image capture device in response to detecting the gesture;
identifying two or more objects of interest in the image;
providing for display of two or more icons for indicating that additional information is available for two or more of the objects of interest, wherein the two or more icons provided for display each comprise icon representations of their respective objects of interest and are presented along an edge of the display in an order corresponding to real world positions of their respective objects of interest in the augmented reality view;
receiving a selection of one of the icons representing an object of interest for which additional information is available; and
providing for display of the additional information in the augmented reality view without obscuring the object of interest represented by the selected icon.

* * * * *